(12) United States Patent
Sundberg

(10) Patent No.: US 12,365,040 B2
(45) Date of Patent: Jul. 22, 2025

(54) CHAINSAW CUTTING LINK, A SAW CHAIN COMPRISING SUCH A CUTTING LINK, A METHOD FOR MANUFACTURING OF A CUTTING LINK, AND A METHOD OF GRINDING A CUTTING LINK

(71) Applicant: HUSQVARNA AB, Huskvarna (SE)

(72) Inventor: Hans-Åke Sundberg, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 726 days.

(21) Appl. No.: 17/603,352

(22) PCT Filed: Apr. 23, 2020

(86) PCT No.: PCT/SE2020/050410
§ 371 (c)(1),
(2) Date: Oct. 13, 2021

(87) PCT Pub. No.: WO2020/218964
PCT Pub. Date: Oct. 29, 2020

(65) Prior Publication Data
US 2022/0212275 A1    Jul. 7, 2022

(30) Foreign Application Priority Data
Apr. 24, 2019 (SE) .................................. 1950501-5

(51) Int. Cl.
*B23D 63/16* (2006.01)
*B23D 65/02* (2006.01)
*B27B 33/14* (2006.01)

(52) U.S. Cl.
CPC ........... *B23D 63/162* (2013.01); *B23D 65/02* (2013.01); *B27B 33/142* (2013.01)

(58) Field of Classification Search
CPC .... B23D 63/162; B23D 65/02; B27B 33/142; B27B 33/12; B27B 33/148
See application file for complete search history.

(56) References Cited

U.S. PATENT DOCUMENTS 1,095,490 A    5/1914  Baker
1,579,577 A *  4/1926  Thompson .......... B26B 21/4006
                                                         76/104.1
(Continued)

FOREIGN PATENT DOCUMENTS

CN    101952072 A      1/2011
CN    203956227 U  * 11/2014 ........... B27B 33/141
(Continued)

OTHER PUBLICATIONS

International Search Report and Written Opinion for International Application No. PCT/SE2020/050410 mailed Sep. 25, 2020.
(Continued)

*Primary Examiner* — Adam J Eiseman
*Assistant Examiner* — Fernando A Ayala
(74) *Attorney, Agent, or Firm* — BURR & FORMAN LLP

(57) ABSTRACT

A chainsaw cutting link (21) comprises: a base portion (29) provided with two rivets holes (20a, 20b) for pivotal interconnection with adjacent links (13), and a cutting tooth (35) extending away from the base portion (29), wherein the cutting tooth (35) comprises a top plate (41) and a side plate (43) defining an angle to form an L-shaped cutting edge (45, 47, 49) facing in a cutting direction (B). The top plate (41) comprises a top plate cutting edge (45) which is sharper than at least a portion (53) of the side plate cutting edge (47).

17 Claims, 8 Drawing Sheets

(56) References Cited

U.S. PATENT DOCUMENTS

| | | | |
|---|---|---|---|
| 3,154,972 A | 11/1964 | Neumeier et al. | |
| 3,269,434 A * | 8/1966 | Cooper | B27B 33/142 83/834 |
| 3,596,689 A | 8/1971 | Oehrli | |
| 3,727,507 A * | 4/1973 | Weiss | B27B 33/142 83/831 |
| 4,095,490 A | 6/1978 | Atkinson | |
| 4,351,065 A | 9/1982 | Bouchard | |
| 4,862,593 A | 9/1989 | Petrovich | |
| 5,101,511 A | 4/1992 | Elverskog | |
| 9,272,440 B1 | 3/2016 | Hutsell | |
| 9,517,571 B2 * | 12/2016 | Wilhelm | B26D 1/0006 |
| 9,610,702 B2 | 4/2017 | Hutsell | |
| 2009/0107317 A1* | 4/2009 | Kewes | B27B 33/142 83/831 |
| 2015/0183124 A1* | 7/2015 | Schell | B27B 33/144 83/834 |
| 2018/0036903 A1 | 2/2018 | Ståhlkrantz et al. | |
| 2018/0271186 A1 | 9/2018 | Milling | |
| 2020/0030898 A1* | 1/2020 | Lux | B23D 63/162 |
| 2022/0009121 A1* | 1/2022 | Beerens | B27B 33/141 |

FOREIGN PATENT DOCUMENTS

| | | | | |
|---|---|---|---|---|
| CN | 106335227 A | | 1/2017 | |
| CN | 109641365 A | | 4/2019 | |
| EP | 0308276 A2 | | 3/1989 | |
| GB | 1038250 A | | 8/1966 | |
| GB | 1091557 A | | 11/1967 | |
| JP | H06128421 A | | 5/1994 | |
| JP | 2019524478 A | * | 5/2018 | B27B 33/145 |
| SE | 445191 B | | 6/1986 | |
| SE | 455363 B | | 7/1988 | |
| SE | 2250163 A1 | * | 2/2022 | A41D 1/08 |
| WO | WO2016139569 | * | 2/2016 | B27B 33/14 |
| WO | 2017050373 A1 | | 3/2017 | |

OTHER PUBLICATIONS

Search Report and Office Action for Swedish Application No. 1950501-5 mailed on Oct. 28, 2019.

* cited by examiner

Fig. 1A
Fig. 1B
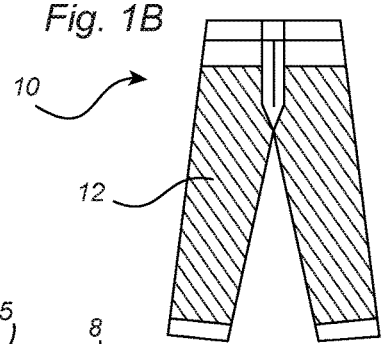
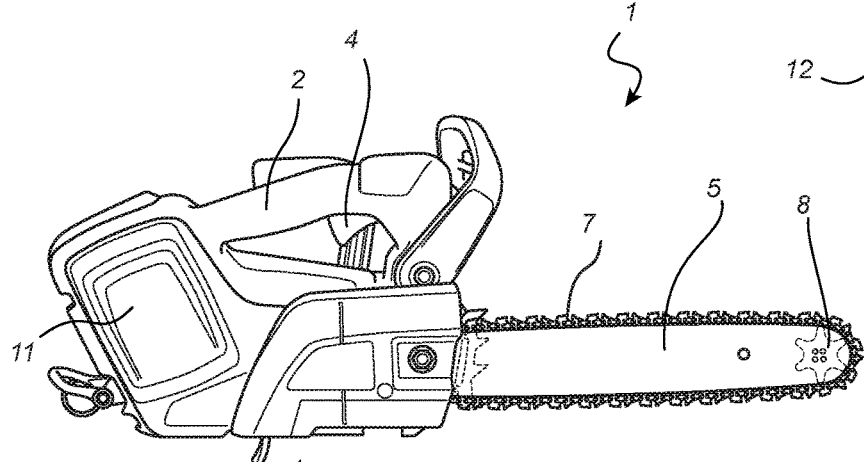
Fig. 2
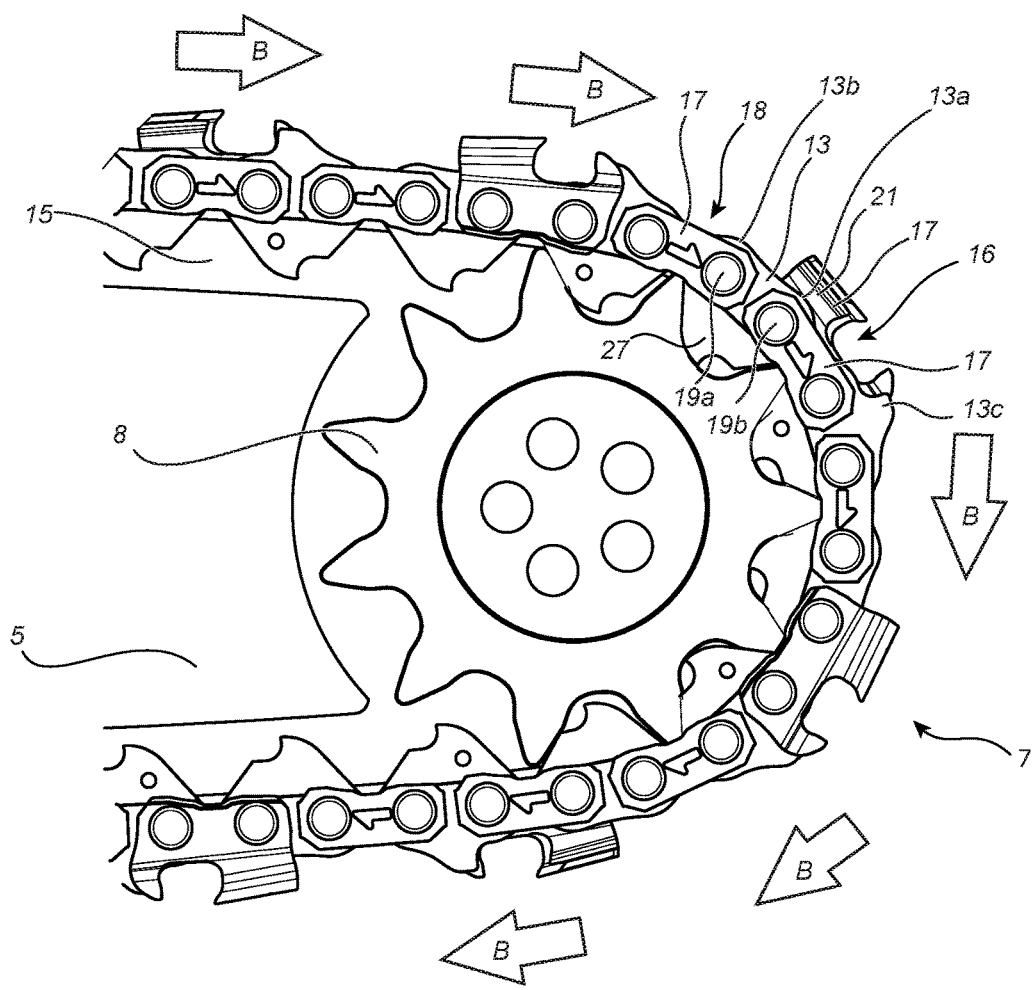

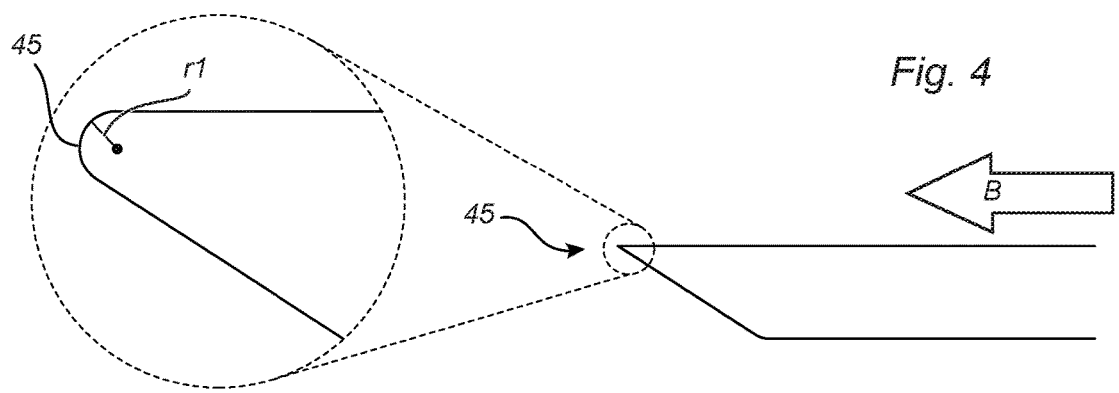
Fig. 4
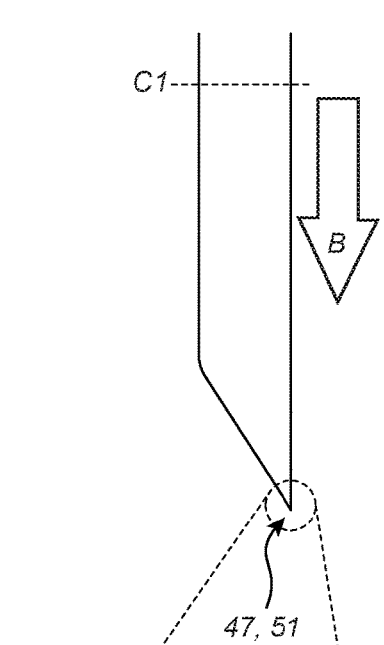
Fig. 5
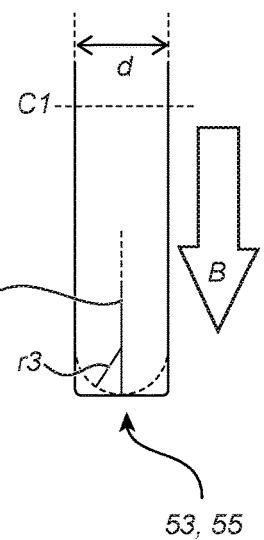
Fig. 6
Fig. 7
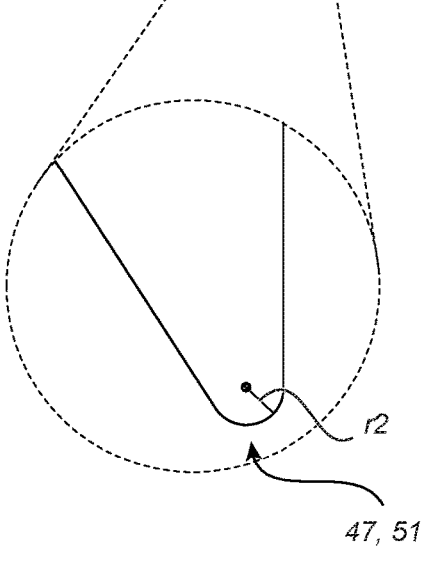
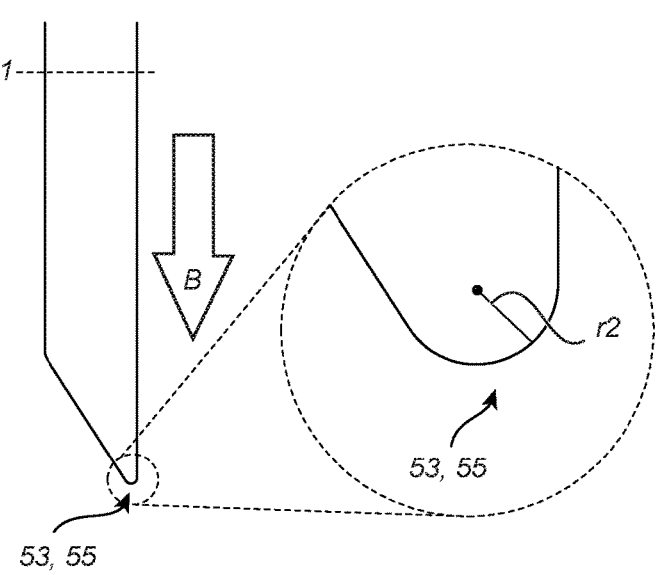
Fig. 8

CHAINSAW CUTTING LINK, A SAW CHAIN COMPRISING SUCH A CUTTING LINK, A METHOD FOR MANUFACTURING OF A CUTTING LINK, AND A METHOD OF GRINDING A CUTTING LINK

FIELD OF THE INVENTION

The present invention relates to the field of chain saws, and more particularly, to a chainsaw cutting link, a saw chain comprising such a cutting link, a method for manufacturing of a cutting link, and a method of grinding a cutting link.

BACKGROUND OF THE INVENTION

Chain saws are commonly used to cut timber or to perform other rigorous cutting operations. Chain saws are typically relatively robust hand-held machines which include a housing containing a driving device, e.g. a motor powered by gasoline or an electric motor. A guide bar extends from the housing, and a saw chain is driven by the driving device around the perimeter of the guide bar at a relative high speed. The saw chain may include different types of links arranged in different configurations. Some of the links included in the saw chain may be cutting links having a sharpened portion for cutting through a medium to be cut, e.g. wood.

U.S. Pat. No. 2,774,396 describes an exemplary cutting link for a saw chain to be used in a chainsaw. There is however always a need for even further improvements to the safety aspect for people working with chainsaws.

SUMMARY

It is an object of the present invention to solve, or at least mitigate, parts or all the above-mentioned problem. To this end, according to a first aspect there is provided a chainsaw cutting link comprising a base portion provided with two rivets holes for pivotal inter-connection with adjacent links, each of said rivet hole defining a respective pivot axis; and a cutting tooth extending away from the base portion, wherein the cutting tooth comprises a top plate and a side plate defining an angle to form an L-shaped cutting edge facing in a cutting direction in which the chainsaw cutting link is configured to move during cutting, the L-shaped cutting edge comprising a top plate cutting edge arranged on the top plate, and a side plate cutting edge arranged on the side plate, wherein the top plate cutting edge is sharper than at least a portion of the side plate cutting edge. Thereby, the cutting link will be less prone to cut through protective workwear, while maintaining a good ability to cut through the material to be cut. Typically, the top plate cutting edge and the side plate cutting edge may be integrally formed of a single piece of metal, such as steel sheet. According to further embodiments, the entire cutting tooth may be integrally formed of a single piece of metal, and optionally, the cutting tooth may be integrally formed with the base portion of a single piece of metal. The top plate may extend along the direction of the pivot axes defined by the rivet holes, and may e.g. extend along a plane which is substantially parallel or slightly inclined relative to a plane comprising the pivot axes. The side plate may extend transverse to said pivot axes, for example along a plane which is substantially perpendicular to the pivot axes. The cutting direction may be substantially parallel to the plane comprising said pivot axes, and perpendicular to said pivot axes.

The purpose of the top plate cutting edge is to shave off a chip from the material to be cut, whereas the purpose of the side plate cutting edge is to cut off e.g. any fibres within the material, which fibres may be parallel to the top plate cutting edge such that they are not cut off by the top plate cutting edge, to obtain a clean cut without tearing. In a newly sharpened saw chain according to prior art, the top plate cutting edge and the side plate cutting edge typically have the same sharpness. As the chain wears, the top plate cutting edge is exposed to more wear than the side plate cutting edge, and thereby becomes blunt faster. Once the chain has become blunt, both the top plate cutting edge and the side plate cutting edge are sharpened in a single sharpening operation, using a round file.

When a brand new saw chain of conventional prior art type is used for the first time, the top plate cutting edge and the side plate cutting edges are typically very sharp, and there is a risk that the saw chain will cut through the protective pants typically worn by the user, and thereby injure his/her leg(s). If at least a portion of the side plate cutting edge is less sharp than the top plate cutting edge, the cutting link will not as easily cut off filaments in the protective pants, since some filaments will engage with said at least a portion. The filaments engaging with the relatively duller portion of the side plate cutting edge may thereby be pulled out from the protective padding of the trousers by the cutting tooth, and follow the cutting tooth to the chainsaw housing. Once reaching the chainsaw housing, the filaments of the protective garment will get stuck in the driving wheel and thereby stop the chain from rotating, which reduces the risk of the user cutting through the protective pants into his/her leg(s).

According to an embodiment, at least 25% of a length, as projected on a plane perpendicular to the cutting direction, of the side plate cutting edge is less sharp than the top plate cutting edge. Thereby, a substantial engagement with the filaments of the protective trousers may be reached. Even though only a small portion of the length of the side plate cutting edge needs to be less sharp than the top plate cutting edge to protect the cutting link from cutting through the protective pants to a certain degree, according to further embodiments, at least 50% or at least 80% of the length of the side plate cutting edge may be less sharp than the top plate cutting edge.

According to an embodiment, the cutting tooth may have a cutting tooth height above the base portion, in an outwards direction perpendicular to the cutting direction, wherein an outermost end of said at least a portion of the side plate cutting edge is located at a height above the base portion of at least 40% of the cutting tooth height. According to further embodiments, the outermost end of said at least a portion of the side plate cutting edge is located at a height above the base portion of at least 50% or at least 60% of the cutting tooth height.

According to an embodiment, the side plate cutting edge may comprise an outermost side plate cutting edge portion, arranged nearest to the top plate, which side plate cutting edge portion is as sharp as the top plate cutting edge. Thereby, a good cutting efficiency for cutting off fibres integrated in a solid material to be cut, such as wood fibres, is maintained. As noted above, the top plate provides a shaving function of the cutting link, whereas the outermost cutting edge portion of the side plate, arranged closest to the top plate, will cut off fibres to release the chip from the object being cut. Both those portions should preferably be sharp to get a good cutting capacity of the cutting link. The top plate and the side plate may define an angle of about 90°, as seen in a cross-section perpendicular to the cutting direction, and may meet at a cutting corner.

According to an embodiment, the cutting tooth has a cutting tooth height above the base portion, in an outwards direction perpendicular to the cutting direction, wherein a lowermost end of said outermost side plate cutting edge portion is located at a height above the base portion of at least 40% of the cutting tooth height. According to further embodiments, the lowermost end of said at least a portion of the side plate cutting edge is located at a height above the base portion of at least 50% or at least 60% of the cutting tooth height.

According to an embodiment, said at least a portion of the side plate cutting edge comprises a trailing, relative to the cutting direction, portion of the side plate cutting edge. The trailing portion is the rearmost portion of the side plate cutting edge when the cutting tooth moves in the cutting direction. When cutting in the protective pants, the filaments torn from the pants will, as they are tightened by the motion of the chain, tend to move to the trailing portion of the side plate cutting edge, and accumulate there. It is therefore preferred that the trailing portion be made dull to maximize the safety of the cutting link.

According to an embodiment, the at least a portion of the side plate cutting edge may have a dull edge radius of curvature, as seen in a cross-section extending substantially parallel to a plane comprising pivot axes defined by the rivet holes, said dull edge radius of curvature being greater than 0.015 mm. Typically, a sharp cutting edge has a radius of curvature of 0.015 mm or less. A radius of curvature greater than 0.015 mm is generally considered dull for the purpose of cutting wood using a chainsaw. According to a further embodiment, the dull edge radius of curvature may be greater than 0.030 mm. In fact, the at least a portion of the side plate cutting edge may even be a straight edge which is parallel to the pivot axes, i.e. corresponding to an infinite radius of curvature. It is pointed out that in the present disclosure, the radius of curvature of the cutting edge is used as a measure of sharpness of the respective cutting edges. However, it will appreciated that there are other ways of measuring sharpness, all of which are intended to be covered by the independent claims.

According to an embodiment, the top plate cutting edge may have a top plate cutting edge radius of curvature, as seen in a cross-section extending in a plane substantially perpendicular to the cutting direction, said top plate cutting edge radius of curvature being less than 0.015 mm. According to a further embodiment, the top plate cutting edge radius of curvature may be less than 0.010 mm.

The respective radii of curvature the cutting edge may be obtained by grinding the respective cutting edges to different respective levels of sharpness.

According to an embodiment, the at least a portion of the side plate cutting edge may comprise a concave portion, wherein an upper end of the concave portion begins at a distance below a top face the top plate.

The concave portion may be formed by a cutout in the side plate cutting edge, which cutout may be formed by punching during manufacture of the cutting link. This cutout may be shaped not to engage with the tools used for grinding the edge, so as to become dull compared to the top plate cutting edge. By way of example, the cutout may have a shape which prevents fully reaching into the cutout using a circular-cylindrical file having a diameter of 4.8 mm, as such files are generally used for sharpening the cutting tooth. The concave portion may begin e.g. less than 5 mm, preferably 2-3 mm, and most preferably 0.5-1 mm, below a top face of the top plate to obtain an optimal balance between safety and cutting efficiency of the cutting link. The concave portion may be arcuate but other concave shapes are possible, such as a V-shape, as long as a relatively dull trailing portion of the cutout is formed.

According to an embodiment, the side plate cutting edge may further comprise a convex portion arranged between the top plate and the concave portion of the side plate cutting edge. The convex portion, which may be at the interface between said at least a portion of the side plate cutting edge which is less sharp, and a sharp outermost side plate cutting edge, may have any substantially convex shape, i.e. it may be curved or form a sharp angle. When the cutting link becomes too dull to be used for cutting, a file may be used for grinding of the top plate cutting edge and the side plate cutting edge. The convex portion may prevent a circular-cylindrical file of the type generally used for sharpening the cutting link from fully reaching into and sharpen the bottom, i.e. trailing portion, of the convex portion while sharpening the top plate cutting edge.

According to an embodiment, the at least a portion of the side plate cutting edge, as seen in a cross-section parallel to a plane comprising the pivot axes defined by the rivet holes, may have a straight front edge extending substantially parallel to said pivot axes. When making the link by punching, a straight front edge of the at least one portion of the side plate cutting edge may obtained; this straight front edge may be at least partly maintained when sharpening the side plate cutting edge. The cutting link may be formed of sheet metal having a sheet metal thickness, and the straight edge may have a width, along the pivot axes, that at least corresponds to 5%, preferably at least 15%, most preferred at least 50% of the sheet metal thickness. If the trailing portion of the side plate cutting edge is formed by punching a cutout, the width of the trailing portion may correspond to the thickness of the material from which the cutting link is formed, minus whatever may be grinded off when grinding the side plate cutting edge.

According to a second aspect, parts or all the above mentioned problems are solved, or at least mitigated, by a saw chain for a chainsaw, the saw chain comprising a plurality of cutting links according to any embodiment of the first aspect defined above. The saw chain may be a new saw chain, which may be packaged in a sales package such as a sealed plastic bag and/or a cardboard box.

The saw chain may comprise a plurality of drive links that each includes a portion thereof that is configured to ride in a channel around a periphery of a guide bar of a chain saw. Each drive link may be attached to an adjacent pair of tie links by rivets that extends perpendicular to the longitudinal length of the chain. A rivet can be provided at the front portion of each drive link to attach the drive link to the rear portion of a pair of preceding tie links. Another rivet may be provided at the rear portion of each drive link to attach the drive link to the front portion of a subsequent pair of tie links. Each pair of tie links may connect to opposing lateral sides of the drive link. The connections may be repeated in an alternating fashion to complete an endless loop of alternating drive links and tie links. For some pairs of the tie links, one of the tie links may be formed as a cutting link according to any embodiment of the first aspect above. When cutting with such a saw chain, the risk of the user getting cut in his/her leg(s) may be reduced, especially when the saw chain is new.

According to a third aspect, there is provided a method of cutting with a chainsaw in chainsaw protective wear, such as a pair of chainsaw protection trousers, the chainsaw protective wear being provided with chainsaw protective filler material configured to be released from the chainsaw protection wear to engage with a drive sprocket of the chainsaw when cutting the chainsaw protective wear, the method comprising cutting in the chainsaw protective wear using a chain as defined above such that the chainsaw protective filler material engages with said at least a portion of the side plate cutting edge.

According to a fourth aspect, the use of a chainsaw cutting link or a saw chain as defined above reducing the ability of cutting through a chainsaw protective padding of chainsaw protective wear.

According to a fifth aspect, there is provided a combination of a saw chain as defined above and a chainsaw protective wear provided with chainsaw protective padding. The chainsaw protective wear and the saw chain may be combined together and sold as a safety kit.

According to a sixth aspect, parts or all the above mentioned problems are solved, or at least mitigated, by a method of manufacturing a cutting link, comprising:
- punching a piece of material to form a cutting link blank comprising a top plate portion and a side plate portion, the side plate portion having a cutout;
- bending the top plate in relation to the side plate to form an L-shaped edge; and
- grinding a side plate cutting edge with a grinding tool that does not mate with the cutout, such that the cutout is sharpened less than a portion of the side plate cutting edge adjacent to the cutout.

According to an embodiment, the method may further comprise grinding a top plate cutting edge with the same grinding tool, simultaneously with grinding the side plate cutting edge.

These methods require less grinding of the link compared to prior art links and thus the link may be less expensive to manufacture. Moreover, the cutout may define an area which is less prone to cutting off, and thereby more prone to getting entangled with, filaments of protective trousers.

According to a seventh aspect, there is provided a method of grinding a cutting link, the method comprising sharpening, using a grinding tool, a top plate cutting edge; sharpening, using a grinding tool, a side plate cutting edge; and blunting, using a grinding tool, at least a portion of the sharpened side plate cutting edge to make the at least a portion of the side plate cutting edge less sharp than the top plate cutting edge. The method may be performed during manufacture of a cutting link, as well as when re-sharpening a cutting link in the field.

According to an embodiment, the sharpening of the top plate cutting edge and the side plate cutting edge may be made in a single step, using a single grinding tool. According to an example, the grinding tool used for sharpening may have a curved profile corresponding to a radius of curvature of about 2.4 mm, so as to be compatible with the most typical commercially available cutting chains.

According to an embodiment, the blunting of the at least a portion of the side plate cutting edge may be made using a grinding tool which is separate from that used for sharpening the side plate cutting edge. According to an example, the grinding tool used for blunting may have a profile corresponding to a radius of curvature of less than about 2.3 mm, such that when blunting a cutting chain of the most typical commercially available type, an outermost side plate cutting edge portion may be left unblunted.

According to an embodiment, the blunting step may comprise refraining from blunting an outermost side plate cutting edge portion.

It is noted that embodiments of the invention may be embodied by all possible combinations of features recited in the claims. Further, it will be appreciated that the various embodiments described for the cutting link are all combinable with the methods and devices as defined in accordance with the third, fourth, fifth, sixth, and seventh aspects of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1A is a side view of a chainsaw;

FIG. 1B is a front view of a pair of chainsaw protective trousers;

FIG. 2 is a side view illustrating a front portion of a guide bar of the chainsaw of FIG. 1a, the guide bar being provided with a saw chain;

FIG. 4 is a schematic view in section of a top plate cutting edge of the cutting link of FIGS. 3A-C, the section being taken along a plane indicated by the line IV-IV in FIG. 3C;

FIG. 5 is a schematic view in section of a side plate cutting edge of the cutting link of FIGS. 3A-C, the section being taken along a first plane indicated by the line V-V in FIGS. 3B and 3C;

FIG. 6 is a schematic view in section of a side plate cutting edge of the cutting link of FIGS. 3A-C, the section being taken along a second plane indicated by the line VI-VI in FIGS. 3B and 3C;

FIG. 7 is a schematic view in section of a side plate cutting edge of the cutting link of FIGS. 3A-C, the section being taken along a third plane indicated by the line VII-VII in FIGS. 3B and 3C;

FIG. 8 is a schematic view in section of a side plate cutting edge of a cutting link according to an alternative embodiment, the section being taken along either of the planes indicated by the lines VI-VI and VII-VII in FIGS. 3B and 3C;

Figure 3A:
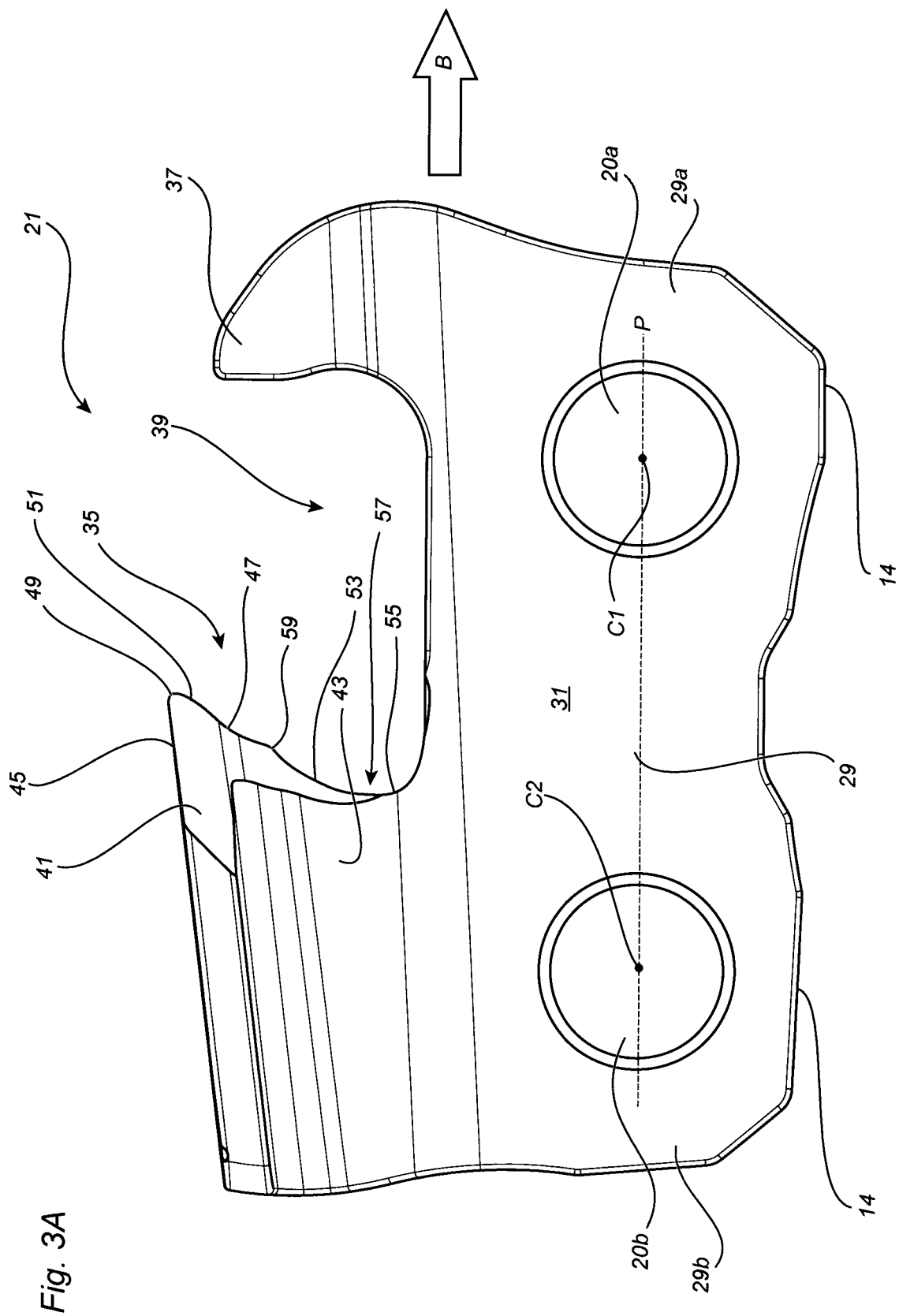
FIG. 3A is a side view of a cutting link of the saw chain of FIG. 2 as seen from a first side.

All the figures are schematic, not necessarily to scale, and generally only show parts which are necessary to elucidate the embodiments, wherein other parts may be omitted.

DETAILED DESCRIPTION OF THE EXEMPLARY EMBODIMENTS

FIG. 1A illustrates a handheld chainsaw 1 comprising a drive unit 3, a guide bar 5 and a saw chain 7 configured as an endless loop, guided along the guide bar 5, between a drive sprocket (not illustrated) and a nose sprocket 8. The drive unit 3 comprises battery 11 and an electric motor (not illustrated), powered by the battery 11. A handle 2 is provided with a trigger 4 for operating the electric motor. The saw chain 7 is configured to be driven around the guide bar 5 responsive to operation of the motor to enable the chainsaw 1 to cut lumber or other materials.

FIG. 1B schematically illustrates, as an example of a chainsaw protective wear, a pair of chainsaw protection trousers 10 to be worn by a user of the chainsaw 1 of FIG. 1A. The chainsaw protective trousers 10 are provided, on a front side thereof, with chainsaw protective padding 12 in the manner well known in the art, and described in e.g. WO17050373A1. The padding 12 comprises chainsaw protective filler material which, if the user of the chainsaw 1 of FIG. 1A accidentally cuts the trousers 10, is configured to be released from the chainsaw protective trousers 10 to engage with the drive sprocket of the chainsaw 1. The protective filler material comprises long fibres of high strength material such as para-aramid (e.g. Kevlar(R)), ballistic nylon, high performance filament yarn made of PET (Poly Ethylene terephtalat), PP (Polypropylene) or PE (Poly Ethylene), PA (Poly Amide) (for example materials such as Dyneema(R) or Vectran(R) etc) which are loosely arranged, usually in multiple layers. When a sawchain contacts the trousers, the outer layer is immediately cut through but the loose fibres of the filler material are drawn out and entangled by the blade so that they wrap around the chainsaw's drive sprocket, locking it solid and halting the chain, and so limiting damage to the operator's leg. Chainsaw protective trousers in the EU must comply with EN381-5 and are classified in three classes and three types, depending on the quantity and arrangement of the filler material. Class 1, 2 and 3 trousers are rated for use with chainsaws running at speeds up to 20 m/s, 24 m/s and 28 m/s respectively, with the requisite level of protection typically being provided by about 3 to about 12 or even more layers of filler material.

FIG. 2 illustrates a portion of the saw chain 7 disposed on the guide bar 5, driven around the nose sprocket 8, as seen in FIG. 1A. For clarity of illustration, the assembly is illustrated with a side plate of the guide bar broken away, to illustrate how the saw chain 7 is guided within the guide bar. The saw chain 7 comprises a plurality of drive links 13, each of which includes a guide tooth 27 that rides in a channel 15 along a periphery of the guide bar 5 and engages with the teeth of the nose sprocket 8. The leading end 13a, with respect to a direction of travel B of the saw chain 7, of each drive link 13 is pivotally connected to leading pair 16 of tie links 17, a trailing end of which sandwich the leading end 13a of the drive link 13 between them. The pivotal connection is formed by a rivet 19b, which penetrates the tie links 17 and the drive link 13, and defines a pivot axis extending in a direction perpendicular to the direction of travel B of the chain 7 during cutting. Similarly, the trailing end 13b of each drive link 13 is pivotally connected, again via a rivet 19a, to a trailing pair 18 of tie links 17, a leading end of which sandwich the trailing end 13b of the drive link 13 between them. The connections between drive links 13 and tie links 17 are repeated in an alternating fashion to complete an endless loop around the guide bar 5. For some pairs 16 of tie links 17, one of the tie links 17 is formed as a cutting link 21. Moreover, each drive link immediately preceding a cutting link 21 may be provided with a bumper 13c. The direction of travel B of the saw chain will, in the following, be referred to as the cutting direction.

Figure 3B:
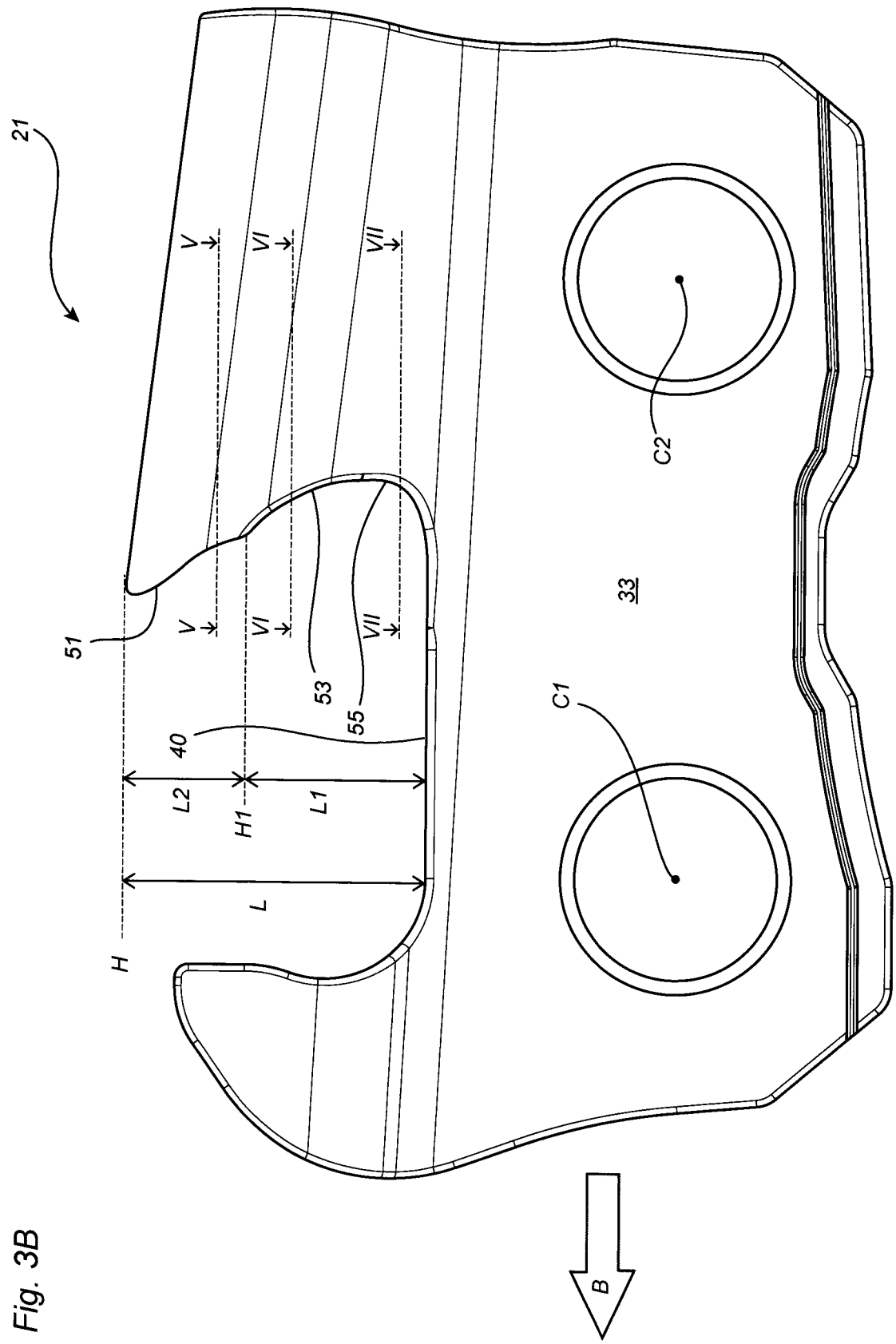
FIG. 3B is a side view of the cutting link of FIG. 3A as seen from a second side opposite to the first side.
Figure 3C:
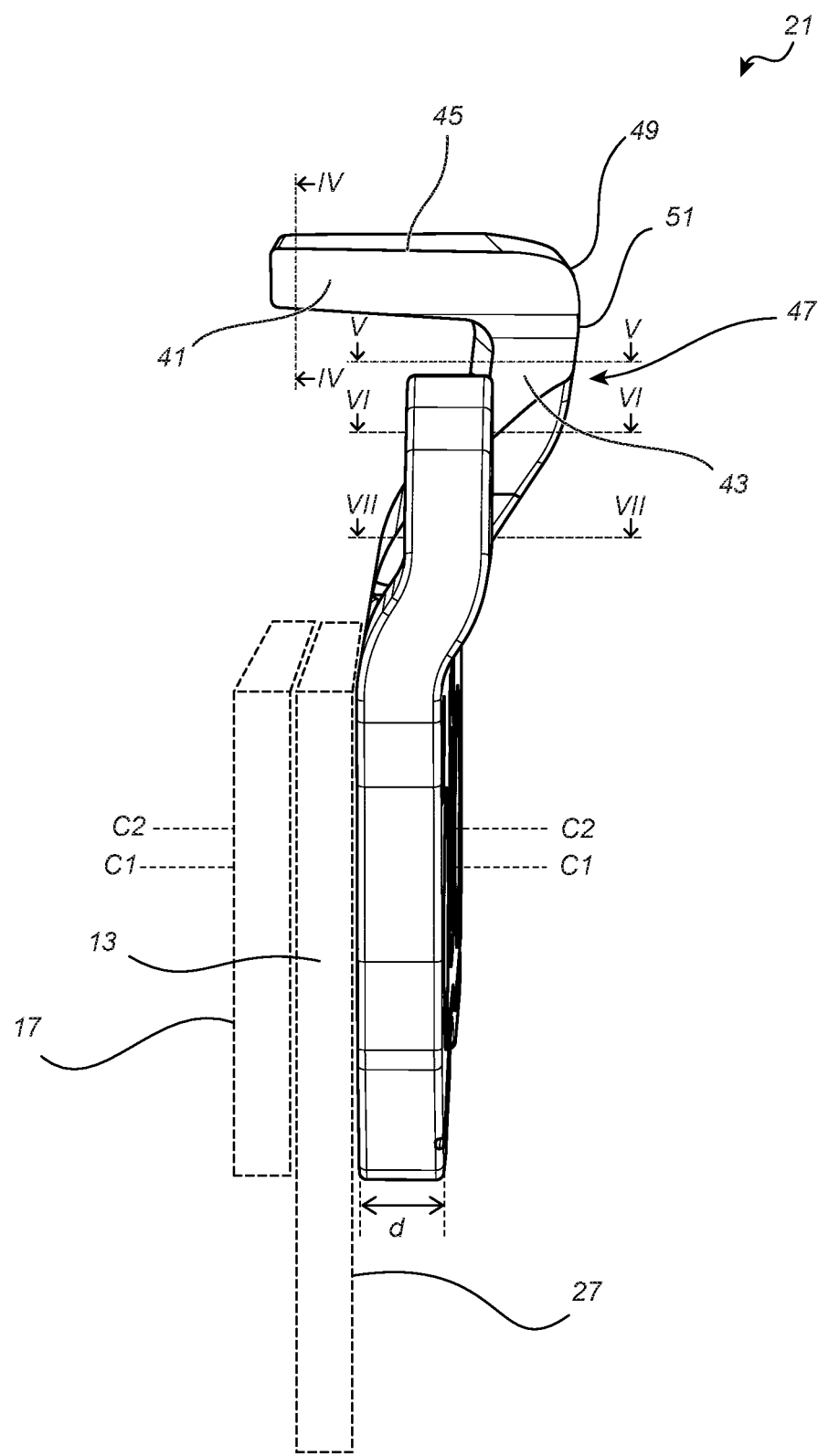
FIG. 3C is a schematic view in perspective illustrating the cutting link of FIGS. 3A-B as seen approximately from the cutting direction.

FIG. 3A illustrates a cutting link 21 as seen from a first side, FIG. 3B illustrates the cutting link 21 as seen from a second side, and FIG. 3C illustrates the cutting link 21 as seen substantially from the cutting direction. Starting with FIG. 3A, the cutting link 21 includes a base portion 29 with a leading end 29a and an opposing trailing end 29b. The cutting link 21 has a first side face 31, visible in the view of FIG. 3A, and an opposite second side face 33, as seen in FIG. 3B. A leading end rivet hole 20a and a trailing end rivet hole 20b each extends between the first side face 31 and the second side face 33. Each of the rivet holes 20a, 20b is configured to receive a respective rivet 19a, 19b (FIG. 2) for connection to a respective drive link 13 and a respective tie link 17. A bottom face 14 of the base portion 29 rides on the periphery of the guide bar 5 (FIG. 2).

The cutting link 21 further includes a cutting tooth 35. The cutting tooth 35 is disposed at the trailing end 29b of the base portion 29 and extends from the base portion 29, when carried on a guide bar 5 (FIG. 2), in an outwards direction perpendicular to the cutting direction B, away from the guide bar, to a height H (FIG. 3B) above the base portion 29. Typical values of the height H may be, for example, between 2 mm and 6 mm. The cutting link 21 also includes a depth gauge 37, disposed at the leading end 29a of the base portion 29, which depth gauge also extends away from the base portion 29 in the outwards direction. The cutting tooth 35 and the depth gauge 37 portion are separated from each other by a depth gauge gap 39, the bottom 40 (FIG. 3B) of which defines the upper edge of the base portion 29. The depth gauge gap 39 may grow over time, as the cutting tooth 35 is worn out due to use, and grinded to remain sharp.

The cutting tooth 35 comprises a top plate 41 and a side plate 43, which meet at an angle defining an L-shape, as seen from the cutting direction (FIG. 3C). The top plate 41 extends along the direction of the pivot axes C1, C2 defined by the rivet holes 20a, 20b, while the side plate 43 extends along a plane which is substantially perpendicular to the pivoting axes C1, C2. The cutting direction B of the cutting link 21 is substantially parallel to a plane P comprising the pivot axes C1, C2, and perpendicular to the pivoting axes C1, C2. The cutting link 21 is integrally formed of steel sheet having a thickness d. Typical values of the thickness d may be, for example, between 0.5 mm and 2 mm.

The top plate 41 comprises a top plate cutting edge 45, which is inclined relative to the cutting direction B as well as to the pivot axes C1, C2, and the side plate 43 comprises a side plate cutting edge 47. The top plate and side plate cutting edges 45, 47 are formed at the leading edge of the cutting tooth 35, such that they face the depth gauge portion 37. The top plate 41 and the side plate 43 meet in a cutting corner 49 forming an angle, as seen from the cutting direction B (FIG. 3C), of about 90°. The side plate cutting edge 47 extends from the cutting corner 49 to the bottom 40 of the depth gauge gap 39, and has a length L, as seen in a projection on a plane perpendicular to the cutting direction B, which corresponds to the height H of the cutting tooth. The side plate cutting edge 47 may be straight or, as in the illustrated embodiment, curved.

When the cutting link 21 is used for cutting wood, the top plate cutting edge 45 shaves off material to form chips, whereas the side plate cutting edge 47 cuts off the fibres of the wood material, thereby releasing the chips from the material being cut. The height of the depth gauge portion 37 relative to the height H of the cutting tooth 35 determines the maximum cut (chip thickness) for each cutting link 21.

FIG. 4 illustrates the top plate 41 as seen in the cross-section IV-IV indicated in FIG. 3C. The top plate cutting edge 45 is sharp and may, for example, have a radius of curvature r1, as seen in a cross-section extending in a plane substantially perpendicular to the pivot axes C1, C2 (FIG. 3C), that is less than 0.015 mm, and preferably less than 0.007 mm.

Referring back to FIG. 3A, the side plate cutting edge 47 comprises an outermost side plate cutting edge portion 51, arranged nearest to the top plate cutting edge 45, which side plate cutting edge portion 51 is as sharp as the top plate cutting edge 45. This outermost side plate cutting edge portion 51 may, for example, extend from the cutting corner 49 along a length L2, as projected on a plane perpendicular to the cutting direction B, of about 0.5-2 mm; in the illustrated embodiment, the outermost side plate cutting edge portion 51 has a length L2 of about 40% of the total side plate cutting edge length L. The side plate cutting edge 47 also comprises a portion 53 which is less sharp, or blunter, than the top plate cutting edge 45. The less sharp portion 53 of the side plate cutting edge 47 extends from a lower end of the outermost, sharper, side plate cutting edge portion 51 to the bottom 40 of the depth gauge gap 39, and includes the rearmost, trailing, portion 55 of the side plate cutting edge 47. The less sharp portion 53 has a length L1, as projected on a plane perpendicular to the cutting direction B, of about 60% of the total side plate cutting edge length L.

FIGS. 5, 6 and 7 illustrate three different cross-sections taken in respective planes which are parallel to the plane P comprising the two pivot axes C1, C2. Each cross-section illustrates the sharpness of the side plate cutting edge at a different respective distance from the cutting corner 49 (FIG. 3A).

FIG. 5 illustrates the side plate cutting edge 47 at the height of the outermost side plate cutting edge portion 51. The outermost cutting edge 51 is as sharp as the top plate cutting edge 45 (FIG. 3C), and may, for example, have a radius of curvature r2, as seen in the illustrated cross-section extending in a plane parallel to the plane P (FIG. 3A), that is less than 0.015 mm, and preferably less than 0.007 mm.

FIG. 6 illustrates a first section of the less sharp portion 53 of the side plate cutting edge 47. Even though partly sharpened at an inclined edge 54, the less sharp portion 53 of the side plate cutting edge 47 has a straight leading edge extending substantially parallel to the pivot axes C1, C2, i.e. substantially perpendicular to the cutting direction B. Thereby, the leading edge of the less sharp portion 53 has, as seen in the illustrated section, an infinite radius of curvature r2, even though functionally, the radius of curvature may rather correspond to a finite radius of curvature r3 of a few tenths of the material thickness d.

FIG. 7 illustrates the trailing portion 55 of the side plate cutting edge 47. As is apparent from the cross-section, the leading edge of the trailing portion 55 is very blunt and has, again, an infinite radius of curvature r2, even though the functional radius r3 may correspond to about twice that of the section of FIG. 6. In the illustrated embodiment, the straight leading edge of the trailing portion 55 of the side plate cutting edge 47 has a width that corresponds the entire thickness d of the material that forms the cutting link 21. According to other embodiments, it may have another width, such as 5% or 50% of the material thickness.

FIG. 8 illustrates an alternative embodiment of the less sharp portion 53. The less sharp portion may have substantially the same sharpness along its entire length, such that the section of FIG. 8 may correspond to the section of FIG. 6 as well as that of FIG. 7. In the embodiment of FIG. 8, the leading edge of the trailing portion 55 has a radius of curvature r2 which is greater than the radius of curvature r1 of the top plate (FIG. 4). By way of example, the radius of curvature r2 may be greater than 0.015 mm, for example, between 0.015 and 0.15 mm, and preferably greater than 0.05 mm. The different levels of sharpness of the top plate and side plate cutting edges 45, 47 may be obtained by sharpening the two edges 45, 47 separately, and to a different extent.

Only a small portion of the length of the side plate cutting edge 47 needs to be less sharp to protect the cutting link 21 from cutting through the protective trousers 10 (FIG. 1B) but in practice, it may be easier to manufacture a cutting link 21 in which at least 80% of the length of the side plate cutting edge 47 will be less sharp than the top plate cutting edge 45. An exemplary manufacturing method will now be described with reference to FIGS. 9A and 9B, following the method steps of the flow chart in FIG. 10. The exemplary manufacturing method may result in a side plate cutting edge in accordance with the sections illustrated in FIGS. 5-7.

Figure 9A:
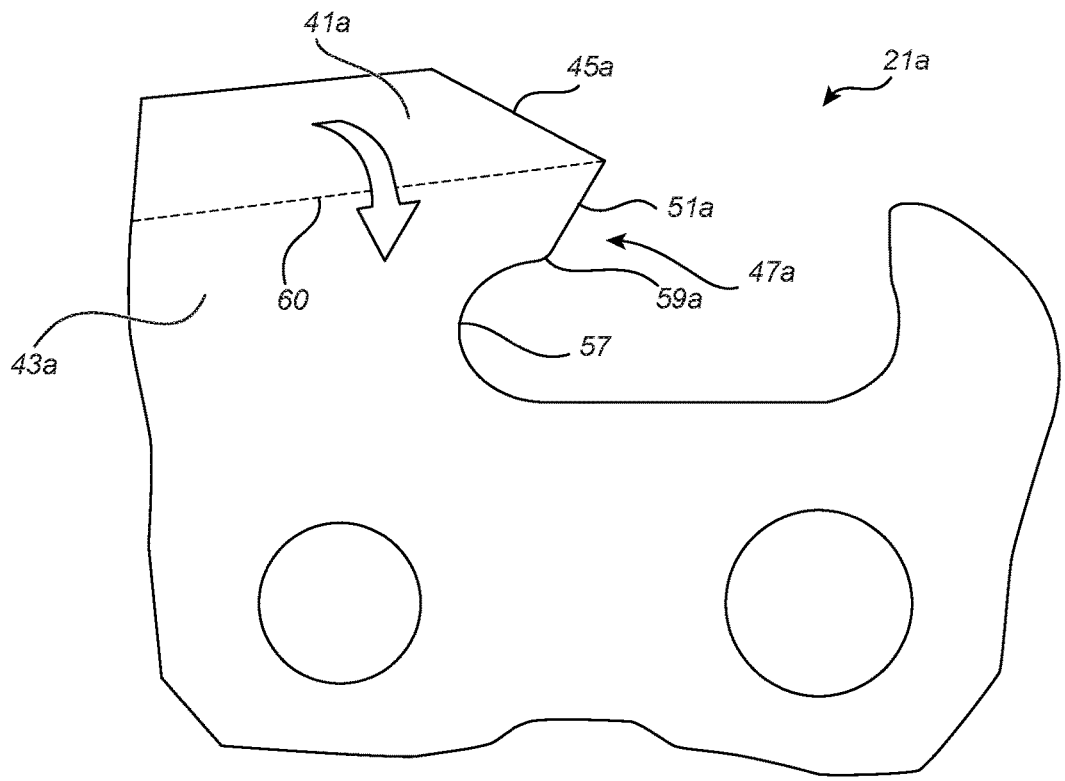
FIG. 9A is a schematic side view of a cutting link blank for forming the cutting link of FIGS. 3A-C, and illustrates a bending step during manufacturing the cutting link of FIGS. 3A-C.
Figure 10:
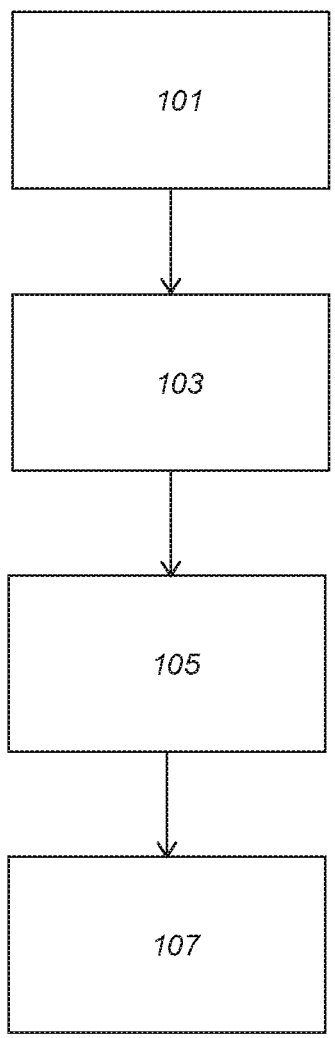
FIG. 10 is a flow chart illustrating a method of manufacturing the cutting link of FIGS. 3A-3C.

In a punching step 101 (FIG. 10), a piece of steel sheet is punched to form a cutting link blank 21a, which is illustrated in FIG. 9A. The cutting link blank 21a comprises a top plate portion 41a having a top plate edge 45a which is to become the top plate cutting edge 45 (FIG. 3A), and a side plate portion 43a. The side plate portion 43a has a side plate edge 47a which is to become the side plate cutting edge 47 (FIG. 3A). A The side plate edge 47a comprises a concave cutout 57a, which meets a substantially straight edge portion 51a between the cutout 57a and the top plate edge 45a at a convex side edge portion 59a. After punching, the cutting link blank 21a may be deburred, for example by barrel polishing.

In a bending step 103 (FIG. 10), the top plate portion 41a is bent in relation to the side plate portion 43a along a bending line 60, in the direction illustrated by the arrow in FIG. 9A, such that the top plate edge 45a and the side plate edge 47a together define the L-shape described with reference to FIG. 3A.

Figure 9B:
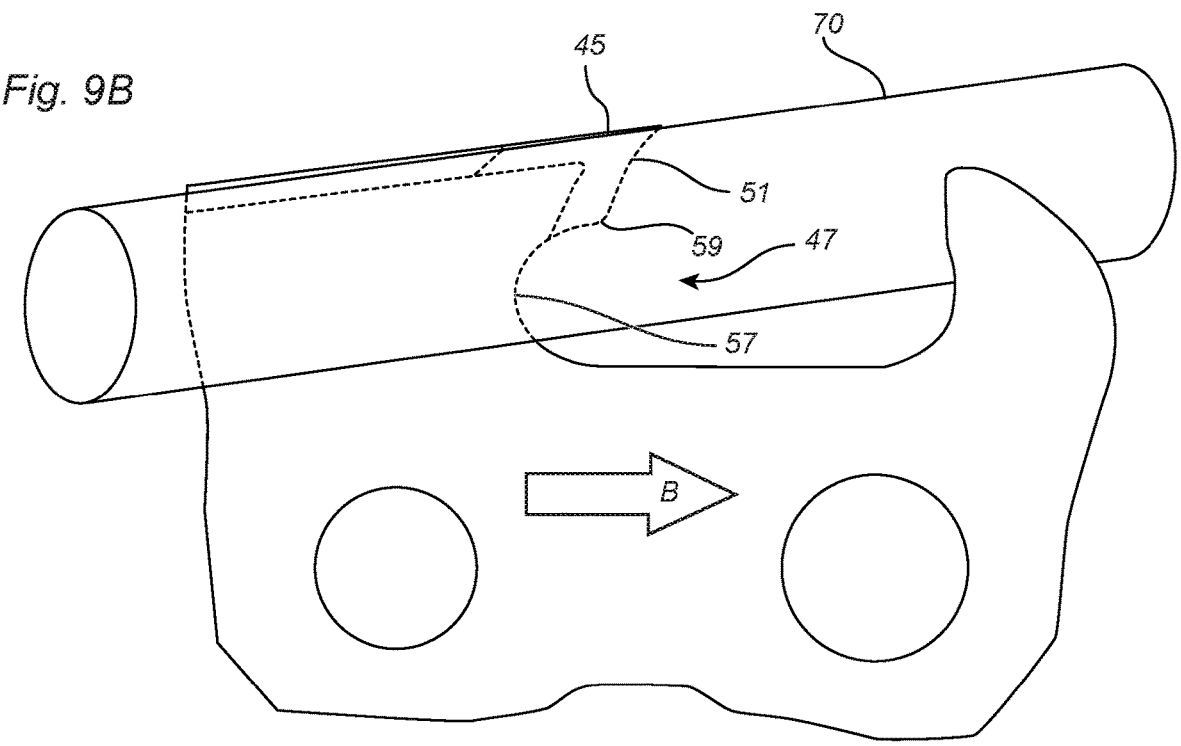
FIG. 9B is a schematic side view corresponding to that of FIG. 9A, and illustrates a grinding step during manufacturing the cutting link of FIGS. 3A-C.

FIG. 9B illustrates a grinding step 105 (FIG. 10), in which the top plate edge 45a (FIG. 9A) and the side plate edge (FIG. 9A) are sharpened into the respective top plate and side plate cutting edges 45, 47. The top plate and side plate cutting edges 45, 47 are sharpened in the same grinding step using a circular-cylindrical grinding tool 70 that does not fully enter into or mate with the cutout 57, such that the cutout 57 is sharpened less than a portion 51 of the side plate cutting edge 47 between the top plate cutting edge 45 and the cutout 57. Thereby, the manufacturing cost of the cutting link 21 may be less than for a cutting link according to prior art, since less material needs to be ground off from the side plate cutting edge 47. According to an embodiment, only the side plate cutting edge may be grinded in step 105, and the top plate may be grinded in a separate step 107 (FIG. 10), which may take place before or after grinding the side plate cutting edge.

The blunt, concave portion 57 of the cutting edge 47 may, for example, meet the outermost, sharp, side plate cutting edge portion 51a at a convex portion 59 of the side plate cutting edge about 0.5-2 mm from the top plate cutting edge 45, such that a good balance between fiber cutting capability and safety is obtained. The convex portion 59 may be arcuate, as illustrated in FIG. 9B, may form a sharp corner, or may have another shape.

Figure 11:
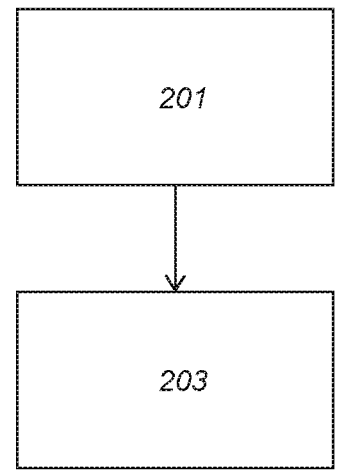
FIG. 11 is a flow chart illustrating a method of grinding a cutting link.
Figure 12A:
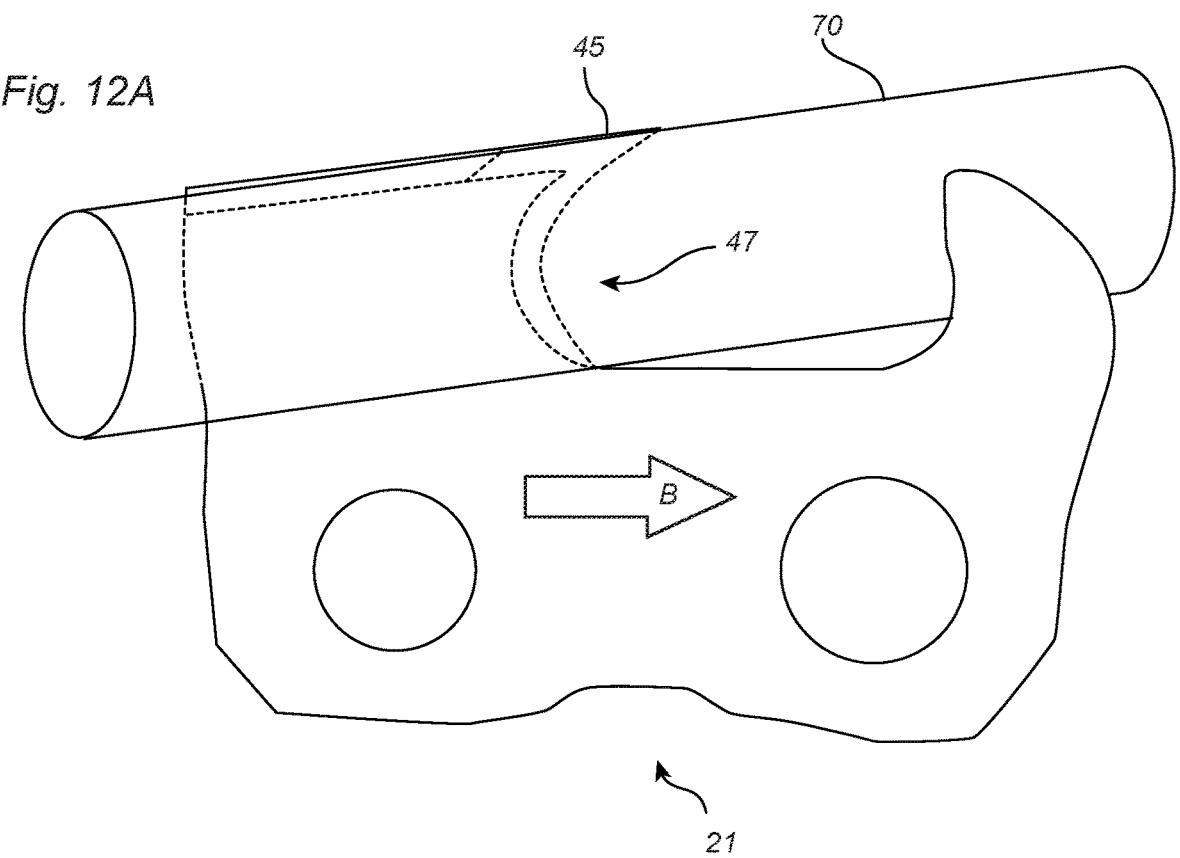
FIG. 12A is a schematic side view of a cutting link, and illustrates a sharpening step during manufacturing the cutting link.
Figure 12B:
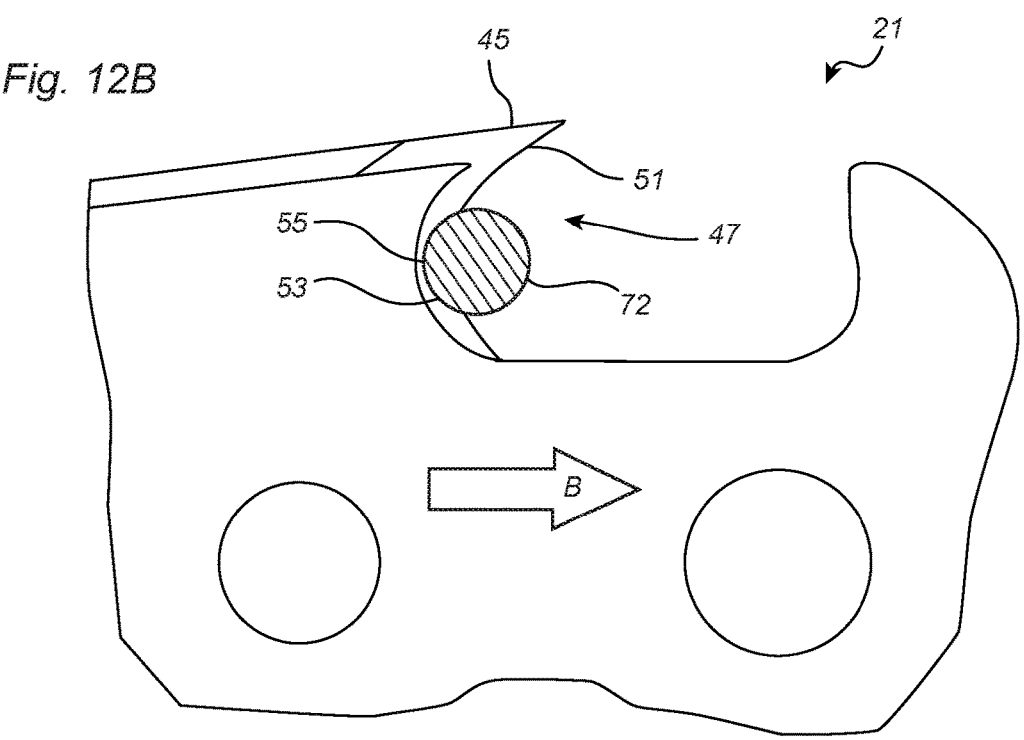
FIG. 12B is a schematic side view of the cutting link of FIG. 12A, and illustrates a blunting step performed after the sharpening step of FIG. 12A.

In an alternative to the manufacturing method above, the cutting link may first be manufactured in accordance with prior art, i.e. without the cutout 57a such that the grinding tool 70 sharpens the top plate cutting edge and the entire length L of the side plate cutting edges 47 to the same sharpness. Thereafter, a portion, such as the trailing portion 55, of the side plate cutting edge 47 may be blunted by grinding it blunt using a smaller grinding tool. The grinding method is illustrated by the flow chart of FIG. 11, and with reference to the drawings of FIGS. 12A and 12B. In a sharpening step 201, illustrated in FIG. 12A, the top plate cutting edge 45 and the side plate cutting edge 47 are sharpened, using a grinding tool 70 having a radius of curvature of about 2.4 mm (i.e. for a circular cylindrical file, corresponding to the conventional file diameter of 4.8 mm), to substantially the same sharpness. Thereafter, in a blunting step 203, illustrated in FIG. 12B, a portion 53 of the sharpened side plate cutting edge 47 is blunted, using a grinding tool 72 having a smaller radius of curvature than the tool 70 of FIG. 12A, to be less sharp than the top plate cutting edge 45. In the illustrated example, after blunting, the blunted portion 53 comprises the trailing portion 55 of the side plate cutting edge 47. In the illustrated example, the blunted portion 53 is blunted by grinding the leading edge of the blunted portion 53 to be straight, in accordance with what's illustrated in the cross-section of any of FIGS. 6 and 7. An outermost side plate cutting edge portion 51 is left unblunted.

The cutting links of a brand new saw chain according to prior art are generally very sharp. This is of course a highly desired property, but it also poses a potential safety risk, since the chain may be sharp enough to cut through the protective padding of chainsaw protection wear 10 (FIG. 1). Thanks to the cutting link 21 defined herein, a saw chain 7 with increased safety may be obtained. Referring back to FIG. 3A, the rearmost, trailing portion 55 of the side plate cutting edge 47 is less sharp than the outermost portion 51 of the side plate cutting edge 47. If accidentally cutting in work wear, such as chainsaw protection pants or trousers 10, filaments from the protective padding of the protection pants will engage with the rearmost, trailing, portion 55 of the side plate cutting edge 47, and be pulled out from the protective padding of the trousers 10. The filaments pulled out of the protective padding will eventually follow the chain 7 to the drive sprocket driving the saw chain 7, get entangled with the drive sprocket, and stop the saw chain 7 from rotating.

As the cutting link 21 is exposed to wear and becomes dull, it is regularly re-sharpened by the user of the chainsaw, typically using a circular-cylindrical file having the shape and dimensions of the grinding tool 70 of FIG. 9B. The convex portion 59 together with the concave cutout 57 thereby prevents the file from grinding the trailing portion 55 (FIG. 3A) of the side plate cutting edge 47. However, as the material of the cutting link 21 wears away due to repeated sharpening, the bluntness of the trailing portion 55 of the side plate cutting edge decreases (i.e. the trailing portion 55 becomes sharper) with the life time of the cutting link 21. If the user wishes to keep the rearmost portion 55 of the side plate cutting edge 47 less sharp than the top plate cutting edge 45, the user may blunt the cutting edge of the trailing portion 55 with a smaller file from a different angle.

In an example embodiment, the cutting link 21 may be formed of hardened steel or other suitable material by stamping, grinding and combinations thereof with or without other techniques also being employed. Some of the surfaces of the cutting link 21 may be coated or plated. For example, some surfaces different from the cutting edges 45, 47 may be chrome-plated.

The invention has mainly been described above with reference to a few embodiments. However, as is readily appreciated by a person skilled in the art, other embodiments than the ones disclosed above are equally possible within the scope of the invention, as defined by the appended patent claims. For example, in each of the illustrated embodiments, the side plate cutting edge comprises one relatively sharper portion 51 and one relatively less sharp portion 53. Alternatively, the side plate cutting edge may comprise two or more relatively sharper cutting edge portions separated by one, two, or more relatively less sharp cutting edge portions.

In the claims, the word "comprising" does not exclude other elements or steps, and the indefinite article "a" or "an" does not exclude a plurality.

The invention claimed is:

1. A chainsaw cutting link comprising:
    a base portion provided with two rivets holes for pivotal interconnection with adjacent links, each rivet hole defines a respective pivot axis; and
    a cutting tooth extending away from the base portion, wherein the cutting tooth comprises a top plate and a side plate, the top plate and the side plate defining an angle to form an L-shaped cutting edge facing in a cutting direction in which the chainsaw cutting link is configured to move during cutting, wherein the L-shaped cutting edge comprises a top plate cutting edge arranged on the top plate and a side plate cutting edge arranged on the side plate, wherein the top plate cutting edge is sharper than at least a portion of the side plate cutting edge, wherein the at least a portion of the side plate cutting edge comprises a concave portion including a rearmost trailing portion of the side plate cutting edge relative to the cutting direction;
    wherein the side plate cutting edge further comprises a convex portion located between the top plate cutting edge and the concave portion of the side plate cutting edge; and wherein the rearmost trailing portion is located proximate to the base portion.

2. The chainsaw cutting link according to claim 1, wherein at least 25% of a length, as projected on a plane perpendicular to the cutting direction, of the side plate cutting edge is less sharp than the top plate cutting edge.

3. The chainsaw cutting link according to claim 1, wherein the cutting tooth has a cutting tooth height above the base portion, in an outwards direction perpendicular to the cutting direction, and wherein an outermost end of the at least a portion of the side plate cutting edge is located at a height above the base portion of at least 40% of the cutting tooth height.

4. The chainsaw cutting link according to claim 1, wherein the side plate cutting edge comprises an outermost side plate cutting edge portion, arranged nearest to the top plate, the outermost side plate cutting edge portion being as sharp as the top plate cutting edge.

5. The chainsaw cutting link according to claim 4, wherein the cutting tooth has a cutting tooth height above the base portion, along an outwards direction perpendicular to the cutting direction, and wherein a lowermost end of the outermost side plate cutting edge portion is located at a height above the base portion of at least 40% of the cutting tooth height.

6. The chainsaw cutting link according to claim 1, wherein the at least a portion of the side plate cutting edge has a dull edge radius of curvature, as seen in a cross-section extending substantially parallel to a plane comprising the pivot axes defined by the rivet holes, the dull edge radius of curvature being greater than 0.015 mm.

7. The chainsaw cutting link according to claim 1, wherein the top plate cutting edge has a top plate cutting edge radius of curvature, as seen in a cross-section extending in a plane substantially perpendicular to a plane comprising the pivot axes defined by the rivet holes, the top plate cutting edge radius of curvature being less than 0.015 mm.

8. The chainsaw cutting link according to claim 1, wherein an upper end of the concave portion that is the closest to the top plate cutting edge is located at a distance from a top face of the top plate.

9. The chainsaw cutting link according to claim 1, wherein the at least a portion of the side plate cutting edge, as seen in a cross-section parallel to a plane comprising the pivot axes defined by the rivet holes, has a straight leading edge extending substantially parallel to the pivot axes.

10. The chainsaw cutting link according to claim 9, wherein the cutting link is formed of sheet metal having a sheet metal thickness, and the rearmost trailing portion of the side plate cutting edge has a straight leading edge extending substantially parallel to the pivot axes, the straight leading edge of the rearmost trailing portion having a width along the direction of the pivot axes that corresponds to at least 5%, preferably at least 15%, and most preferred at least 50% of the sheet metal thickness.

11. A saw chain for a chainsaw, the saw chain comprising plurality of chainsaw cutting links according to claim 1.

12. A method of cutting with a chainsaw in chainsaw protective wear, such as a pair of chainsaw protection trousers, the chainsaw protective wear being provided with chainsaw protective filler material configured to be released from the chainsaw protection wear to engage with a drive sprocket of the chainsaw when cutting the chainsaw protective wear, the method comprising cutting in the chainsaw protective wear using the saw chain according to claim 11 such that the chainsaw protective filler material engages with the at least a portion of the side plate cutting edge.

13. The method of claim 12 wherein the saw chains is configured to reduce an ability of cutting through a chainsaw protective padding of chainsaw protective wear.

14. A combination comprising the saw chain according to claim 11 and a chainsaw protective wear provided with chainsaw protective padding.

15. The chainsaw cutting link according to claim 1, wherein the side plate cutting edge includes (i) an outermost side plate cutting portion located nearest to the top plate and being as sharp at the top plate cutting edge, (ii) an intermediate portion extending from a lowermost end of the outermost side plate cutting portion and being less sharp than the outermost side plate cutting portion, and (iii) the rearmost trailing portion extending from a lowermost end of the intermediate portion and being proximate the base portion, and being less sharp than the intermediate portion.

16. The chainsaw cutting link according to claim 15, wherein the intermediate portion meets the outermost side plate cutting portion at the convex portion of the side plate cutting edge.

17. The chainsaw cutting link according to claim 16, wherein the convex portion is located from about 0.5-2 mm from the top plate cutting edge.

* * * * *